US011733680B2

(12) United States Patent
Chamie et al.

(10) Patent No.: US 11,733,680 B2
(45) Date of Patent: Aug. 22, 2023

(54) CONTROL OF MATRIX CONVERTERS USING MACHINE LEARNING

(71) Applicant: Hamilton Sundstrand Corporation, Charlotte, NC (US)

(72) Inventors: Mahmoud El Chamie, Manchester, CT (US); Vladimir Blasko, Avon, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 615 days.

(21) Appl. No.: 16/826,635

(22) Filed: Mar. 23, 2020

(65) Prior Publication Data
US 2021/0294304 A1   Sep. 23, 2021

(51) Int. Cl.
*G05B 19/4155* (2006.01)
*G06N 20/00* (2019.01)
(Continued)

(52) U.S. Cl.
CPC ......... *G05B 19/4155* (2013.01); *G05B 13/04* (2013.01); *G06N 5/02* (2013.01);
(Continued)

(58) Field of Classification Search
None
See application file for complete search history.

(56) References Cited

U.S. PATENT DOCUMENTS 9,298,172 B2 * 3/2016 Tesauro .................. G06N 5/02
10,320,306 B1 * 6/2019 Blasko .................. H02M 5/297
(Continued)

FOREIGN PATENT DOCUMENTS

| CN | 109787531 A | 5/2019 |
|---|---|---|
| CN | 109921707 A | 6/2019 |
| CN | 110021947 A | 7/2019 |

OTHER PUBLICATIONS

Zhang et al. "Predictive voltage conrtol of direct matrix converter with reduced number of sensors for the renewable energy and mnicrogrid applications", Oct. 1, 2017, 2017 IEEE energy Conversion Congress and Exposition (ECCE), pp. 3309-3315. (Year: 2017).*

(Continued)

*Primary Examiner* — Jason D Mitchell
(74) *Attorney, Agent, or Firm* — Locke Lord LLP; Scott D. Wofsy; Judy R. Naamat

(57) ABSTRACT

A method of controlling a matrix converter system is provided. The method includes receiving an operating condition and consulting a trained Q-data structure for reward values associated with respective switching states of the switching matrix for an operating state that corresponds to the operating condition. The Q-data structure is trained using Q-learning to map a reward value predicted for respective switching states to respective discrete operating states. The method further includes sorting the reward values predicted for the respective switching states mapped to the operating state that corresponds to the operating condition, selecting a subset of the set of the mappings as a function of a result of sorting the reward values associated with the switching states of the operating state, evaluating each switching state included in the subset, and selecting an optimal switching state for the operating condition based on a result of evaluating the switching states of the subset.

16 Claims, 6 Drawing Sheets

(51) Int. Cl.
  *G05B 13/04* (2006.01)
  *G06N 5/02* (2023.01)
  *H02M 5/00* (2006.01)
(52) U.S. Cl.
  CPC ... *G06N 20/00* (2019.01); *G05B 2219/42058* (2013.01); *H02M 5/00* (2013.01)

(56) References Cited

U.S. PATENT DOCUMENTS

| | | | |
|---|---|---|---|
| 10,459,472 B2 | 10/2019 | Blasko | |
| 10,587,214 B1* | 3/2020 | Blasko | H02M 5/293 |
| 10,594,227 B1* | 3/2020 | Blasko | H02P 27/16 |
| 11,290,023 B2* | 3/2022 | Blasko | G05B 13/048 |
| 2003/0202369 A1* | 10/2003 | Schierling | H02M 5/2573 |
| | | | 363/131 |
| 2003/0202370 A1* | 10/2003 | Simon | H02M 5/271 |
| | | | 363/131 |
| 2016/0308356 A1 | 10/2016 | Das et al. | |
| 2017/0117841 A1 | 4/2017 | Watanabe et al. | |
| 2017/0160760 A1* | 6/2017 | Blasko | G05B 13/048 |
| 2019/0019080 A1* | 1/2019 | Claessens | G06N 3/0454 |
| 2019/0199229 A1* | 6/2019 | Blasko | H02M 5/29 |
| 2019/0348921 A1* | 11/2019 | Vijayagopal | H02M 5/297 |
| 2020/0310372 A1* | 10/2020 | Wang | G05B 19/042 |
| 2020/0328709 A1* | 10/2020 | Blasko | G05B 13/048 |
| 2020/0376927 A1* | 12/2020 | Rajaie | B60H 1/00764 |
| 2021/0294304 A1* | 9/2021 | Chamie | H02M 5/297 |

OTHER PUBLICATIONS

Lee et al. "Improved Sensorless Vector Control for Induction Motor Drives Fed bya Matrix converter Using Nonlinear Modeling and Disturbance Observer", Mar. 2006, IEEE Transactions on Energy Conversion, vol. 21, No. 1, pp. 52-59 (Year: 2006).*

Extended European Search Report for European Patent Application No. EP21164289.7, dated Sep. 1, 2021.

Jianwei, Z., et al: "Predictive voltage control of direct matrix converter with reduced number of sensors for the renewable energy and microgrid applications", 2017 IEEE Energy Conversion Congress and Exposition (ECCE), IEEE, Oct. 1, 2017 (Oct. 1, 2017), pp. 3309-3315, XP033247245, DOI: 10.1109/ECCE.2017.8096597 [retrieved on Nov. 3, 2017]; pp. 3311-3313; figure 5.

Examination Report for European Patent Application No. EP21164289.7, dated Jan. 19, 2023.

Anonymous: "O-learning—Wikipedia", Mar. 18, 2020 (Mar. 18, 2020), XP093013868, Retrieved from the Internet: URL:https://en.wikipedia.org/w/index.phptitle=O-learning&oldid=946174599#cite_note-12 [retrieved on Jan. 13, 2023].

Anonymous: "An introduction to Q-Learning: reinforcement learning", Sep. 3, 2018 (Sep. 3, 2018), XPO93O13919, Retrieved from the Internet: URL:https://www.freecodecamp.org/news/an-introduction-to-q-learning-reinforcement-learning-14ac0b4493cc/ [retrieved on Jan. 13, 2023].

* cited by examiner

CONTROL OF MATRIX CONVERTERS USING MACHINE LEARNING

STATEMENT REGARDING FEDERALLY SPONSORED RESEARCH OR DEVELOPMENT

This invention was made with government support under contract number DE-AR00000891, under the ARPA-E FOA, titled Power Conversion Through Novel Current Source Matrix Converter, awarded by the U.S. Department of Energy, April 2018, under Award DE-FOA-1727-1510 under the CIRCUITS program. The government has certain rights in the invention.

BACKGROUND

1. Field of the Disclosure

The present disclosure relates to matrix converters of power converters or inverters, and more particularly, to predictive control of a matrix converter using machine learning.

2. Description of Related Art

Model Predictive Control (MPC) of a matrix converter (MxC) can provide certain advantages over traditional proportional integral (PI) controls. One advantage is that MPC enables simplified application of additional criteria (such as switching loss reduction, common mode voltage reduction, and harmonic reductions or eliminations). One or more additional criteria for controlling the MxC can be applied by adding an objective for each criterion to the cost function. Unlike PI controls, this approach avoids the need to change control architecture or add control loops that can affect system stability. Another advantage is that MPC is very effective during transients because it can adapt its switching frequency at different operation regimes (e.g., transients vs. steady-state) as opposed to a PI controlled pulse width modulation (PWM) that has a fixed switching frequency.

The downside of the MPC is that it requires a greedy search by performing a search at each sampling period over every possible switching state. This greedy search consumes resources and may become infeasible as the number of possible switching states increases with development of future power converter or inverter architectures.

While conventional methods and systems have generally been considered satisfactory for their intended purpose, there is still a need in the art to use artificial intelligence for MxC MPC control that has the advantages of MxC MPC but boosts computation speed and/or reduces the searching computation load performed per sampling period.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a matrix converter system of an industrial plant system. The matrix converter system includes a switching matrix coupled between an input side and an output side. The matrix converter system includes a model predictive controller (MPC) configured to select a switching state of the switching matrix from a plurality of switching states. The MPC is configured to receive an operating condition of the industrial plant system and consult a Q-data structure for reward values associated with respective switching states for an operating state that corresponds to the operating condition. The Q-data structure is trained in a real or simulation environment of the industrial plant system using Q-learning to map till convergence a reward value predicted for respective switching states of the plurality of switching states to respective discrete operating states of a plurality of operating states. The MPC is further configured to sort the reward values predicted for the respective switching states mapped to the operating state that corresponds to the operating condition, select a subset of the set of the mappings as a function of a result of sorting the reward values associated with the switching states of the operating state, evaluate each switching state included in the subset, and select an optimal switching state for the operating condition based on a result of evaluating the switching states of the subset.

In accordance with other aspects of the disclosure, a method of controlling a matrix converter system is provided a control system for a matrix converter is provided, wherein the matrix converter has a switching matrix coupled between an input side and an output side. The control system includes an MPC configured to select a switching state of the switching matrix from a plurality of switching states, the MPC is configured to receive an operating condition of the industrial plant system and consult a Q-data structure for reward values associated with respective switching states for an operating state that corresponds to the operating condition. The Q-data structure is trained in a real or simulation environment of the industrial plant system using Q-learning to map till convergence a reward value predicted for respective switching states of the plurality of switching states to respective discrete operating states of a plurality of operating states. The control system is further configured to sort the reward values predicted for the respective switching states mapped to the operating state that corresponds to the operating condition, select a subset of the set of the mappings as a function of a result of sorting the reward values associated with the switching states of the operating state, evaluate each switching state included in the subset, and select an optimal switching state for the operating condition based on a result of evaluating the switching states of the subset.

These and other features of the systems and methods of the subject disclosure will become more readily apparent to those skilled in the art from the following detailed description of the embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE EMBODIMENTS

A matrix converter (MxC) control system is disclosed that uses model predictive control (MPC) in the inner control loop for controlling an MxC of a power converter or inverter. The MxC control system uses machine learning to boost computation speed by reducing search space from all of the possible switching states to a subset selected from the possible switching states. This reduction in search space reduces computation load and time and allows for increased efficiency of control.

The machine learning applies reinforcement learning (RL) to create, using Q-learning, a Q-data structure. The Q-data structure maps expected predicted effects, referred to as rewards (which is the inverse of costs) for each of the possible switching states of the MxC in each respective operating state of the power converter. Each of the operating states corresponds to a different set of operating conditions (also referred to as an operating condition) of the power converter or inverter.

During real-time operation, at each sampling period, the current operating condition is used to determine a corresponding operating state. For the operating state, possible switching states are ranked as a function of their associated award obtained from the Q-data structure. A subset of the switching states is selected based on ranking. Each of the selected switching states is evaluated.

Figure 1:
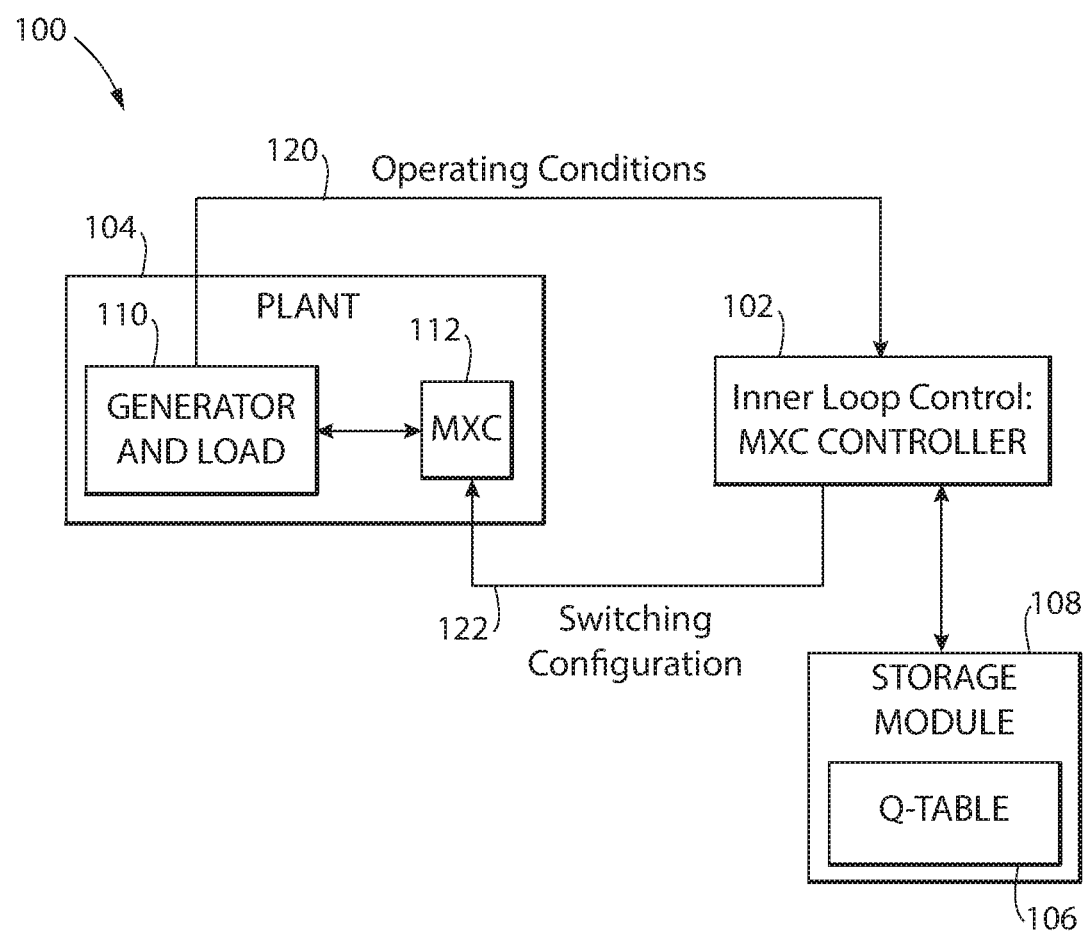
FIG. 1 shows a block diagram of an equivalent circuit of an example matrix converter coupled between a generator and a load, in accordance with embodiments of the disclosure.

Turning now descriptively to the drawings, in which similar reference characters denote similar elements throughout the several views, FIG. 1 depicts an exemplary plant system 100 in which below illustrated embodiments may be implemented. Plant system 100 includes an MxC controller 102 that controls an MxC of an industrial plant system 104 (referred to as plant 104). Plant 104 is an industrial plant that includes a generator (e.g., an input side), and a load (e.g., an output side), shown together as component 110. The generator provides an electrical signal (voltage and/or current) to the MxC 112. The MxC 112 includes a matrix of switches controlled by the MxC controller 102. The load receives an electrical signal (voltage and/or current) from the MxC controller 102. In an example embodiment, without limitation to the particular embodiment, the generator is an aircraft generator and the load is an aircraft motor.

MxC controller 102 includes a processing device that receives an operating condition from plant 104 via signal path 120 each sampling period, consults a trained Q-table 106 for selecting a subset of possible switching states to analyze, controls the MxC 112 to analyze the selected switching states, and selects a switching state to use for the sampling period.

The processing device included with the MxC controller 112 can include, for example, a programmable logic device (PLOD), microprocessor, digital signal processor (DSP), a microcontroller, a field programmable gate array (FPGA), an application specific integrated circuit (ASIC), and/or other discrete or integrated logic circuitry having similar processing capabilities.

The Q-table 106 is a data structure trained by Q-learning reinforcement learning (RL) algorithm till convergence. The RL enables mapping conditions of the MxC 112 to the most important switching states. Using RL, the Q-table is trained and applied by focusing on learning by the MxC controller 102, via direct interaction between the industrial plant 104 and its environment without the need to rely on complete models of the environment. Q-table 106 provides an entry for each switching state at each operating condition. Each entry can be initialized with an initial reward value, and then updated with an estimated predictive value as the Q-table 106 is trained. In this way, Q-table 106 provides a simple representation of converter control configurations using artificial intelligence.

The data structure for representing Q-table 106 is referred to as a table, but it is not limited to a particular data structure. In the example embodiment shown, Q-table 106 is a lookup table (LUT). Q-table 106 is stored in a storage module 108. Storage module 108 can be remote from or integrated into MxC 112. Application of Q-table 106 reduces computation time to compute fast control of switching states of the MxC 112 and enables applying MPC algorithms with an expanded prediction horizon h (h>1). This approach can learn cause and effect relationships between loads, input voltages and currents, and output voltages and currents, converge based on explicit objectives, and extended search horizons. Furthermore, this approach reduces or minimizes uncertainty and nondeterminism associated with different approaches that use models.

A mathematical model behind Q-table structure and table values is Markov decision process (MDP), by defining in each entry of the Q-table operating state, switching state, and reward (wherein reward is the inverse of cost) according to the available control variables (switching states). Even with an unknown dynamic evolution of load during operation of the industrial plant 104, RL algorithm can learn an optimal control policy from training data.

A challenge arises in applying RL to industrial operating plants, since it is known that in settings involving high-dimensional or continuous state spaces, conventional RL approaches suffer from a so-called 'curse of dimensionality,' that discourages their employment (see Bertsekas, "Dynamic Programming and Optimal Control: 3rd edition," Vols. 1 and 2, Athena Scientific, 2007). As a solution to this problem, the Q-table is provided with defined discrete operating states, wherein the operating states are determined by applying space vector modulation (SVM) techniques.

In an example application of Q-table 106 to an industrial plant 104, the MxC 112 is controlled with inner and outer loops. The outer loop control provides references from the MxC controller to be followed. The inner control loop is the MxC controller that uses MPC with RL. Voltage at high-voltage end $v_{ABC}$ is connected to capacitors or a voltage source and voltage at low-voltage end $v_{abc}$ is connected to inductors or a current source of the MxC 112, wherein $v_{ABC}$ and $v_{abc}$ are three phase voltages.

A switching state variable $S_{xy}$ represents a switching state of the matrix of switches for switching coupling between the high-voltage and the low-voltage end, wherein for a three-phase input and three-phase output, $S_{xy}$ has $2^9=512$ switching states, but only 27 possible switching states are allowed to avoid damaging devices with over voltages (open circuit) or over currents (short circuit) in the plant.

For any given configuration, the space vector definition of the low-voltage side vector is as follows:

$$v_{abc} = \frac{2}{3}(V_a + aV_b + a^2 V_c)$$

with $$a = \exp\left(\frac{j2\pi}{3}\right) = -\frac{1}{2} + \frac{j\sqrt{3}}{2},$$

which represents the 120° phase displacement between the phases and $V_a$, $V_b$, and $V_c$, the phase-to-neutral voltages of the MxC low-voltage side. While the input given configurations has 27 states, $v_{abc}$ may or may not have 27 distinct vectors, because different configurations might map to the same vector. For example, all three switching (1,1,1), (2,2,2), and (3,3,3), map to the same zero-vector, i.e., $v_{abc}=0$. This is expected, because in those cases the phases would only carry common-mode voltage. The voltage vector possible outcome is a function of the phase of the voltage waveforms at the high-voltage side.

Possible voltage vectors and switching states generated by the MxC 112 change over time and can be plotted at different time instants. A low-voltage reference vector can be plotted anywhere in the operating state space. SVM with pulse width modulation (PWM) can be applied to choose a few operating states around the low-voltage reference vector to generate the reference in the inner control loop. This process would work well for a power converter in which a high voltage is fixed and not changing with time and the number of switching states is small. However, in a converter in which the high-voltage side is AC (as with the matrix converter), or having a complicated topology with a high number of switching states, classical PWM control becomes more complicated and challenging. This challenge can be addressed using MPC with RL, in accordance with embodiments of the disclosure. Once the operating conditions of the system states are determined, RL can be used by dynamically applying actions and determining reward values to the operating states, defining an MDP for which Q-learning is an algorithm to compute optimal subset of actions.

The operating states are a discrete approximation summarizing the continuous currents and voltages in the industrial plant 104. The discretization is based on two continuous inputs.

Figure 2A:
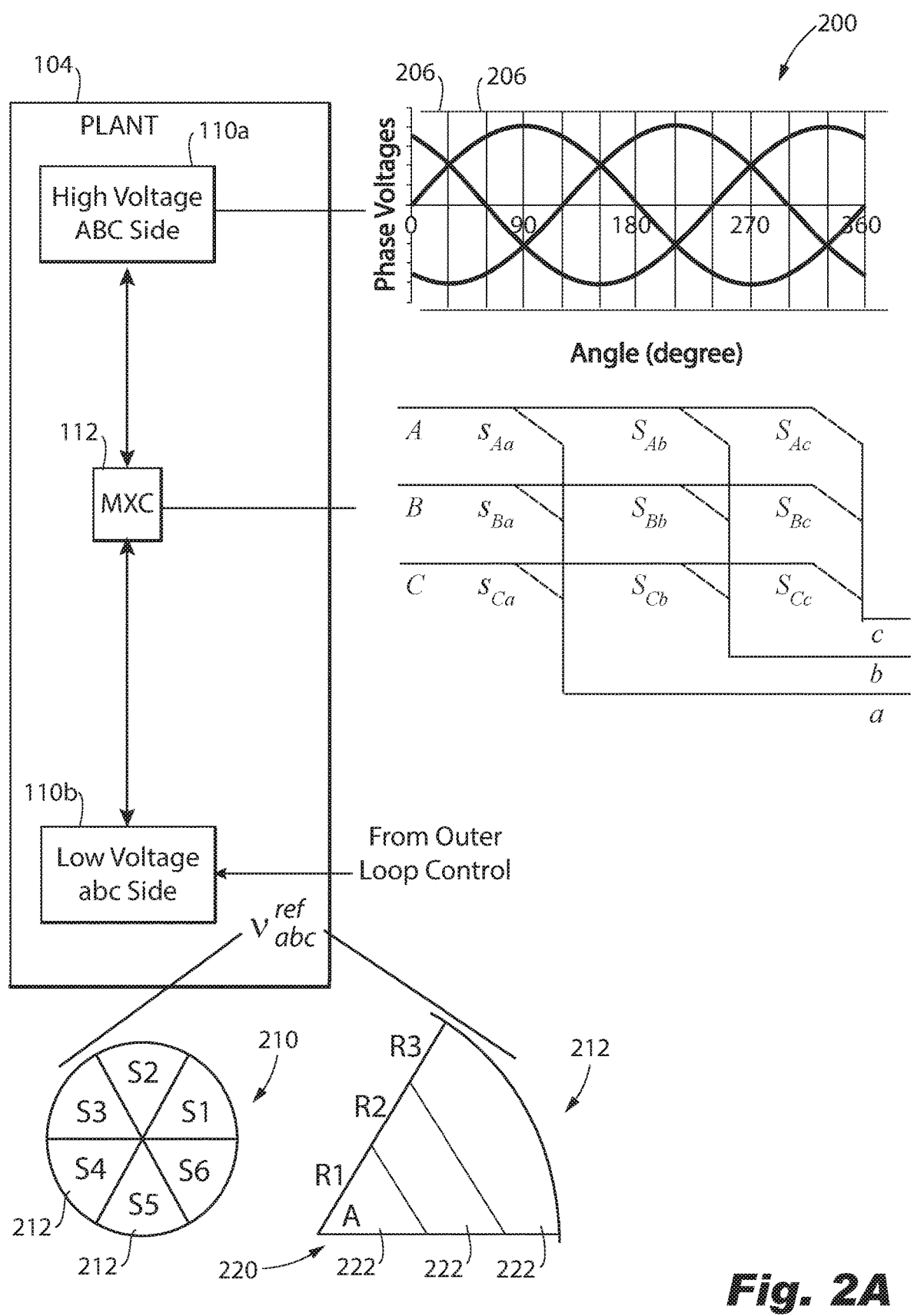
FIG. 2A shows a set of plots used for determination of operating states from two continuous inputs, in accordance with embodiments of the disclosure.
Figure 2B:
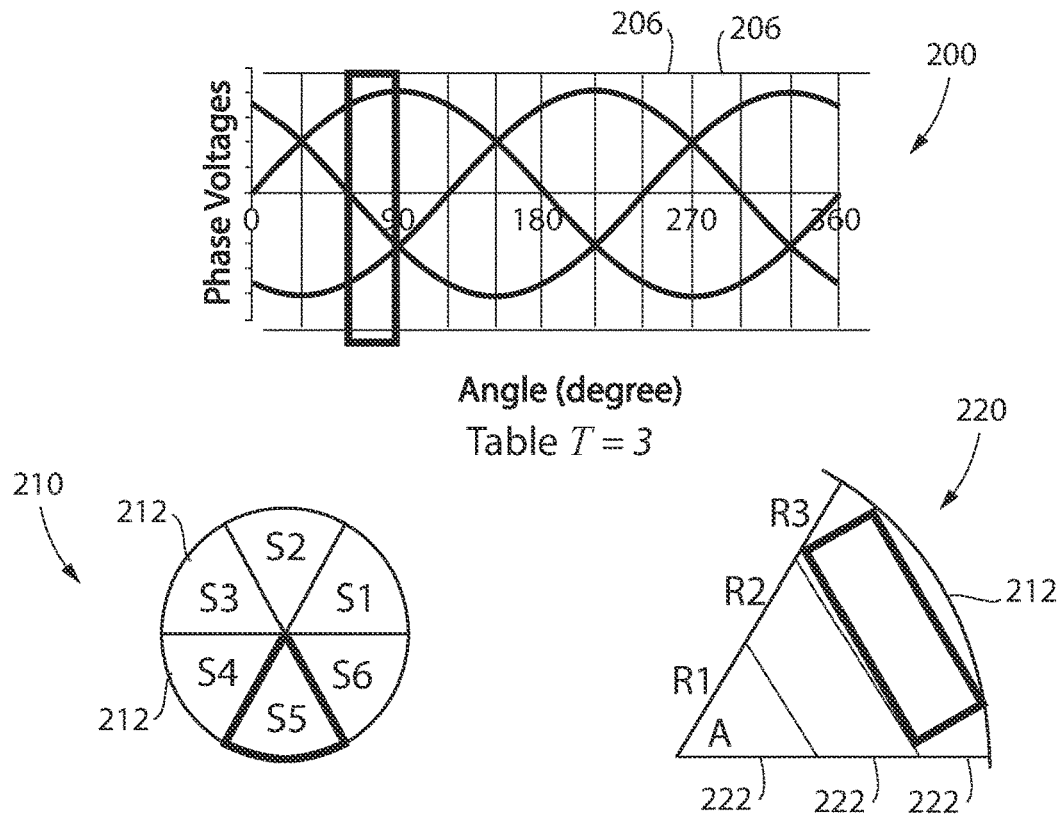
FIG. 2B shows a set of plots illustrating application of determining discrete operating conditions from ABC voltage values and reference abc voltage provided by an outer loop control, in accordance with embodiments of the disclosure.

With reference to FIGS. 2A and 2B, FIG. 2A shows an example application where plots 200, 210, and 220 show determination of operating states from two continuous inputs. Plot 200 shows a first continuous input associated with a high-voltage ABC side 110A which is one of an input side or output side 110 of plant 104. The first continuous input is represented as $V_{ABC}$, shown in plot 200 as phase voltages varying over angles 0-360 degrees, divided into multiple uniform sections 206. In the example shown, the sections 206 are 30-degree sections. At any given time instant, there are 12 possible sections 206 referred to as Tables $T \in \{1, \ldots, 12\}$, formally, $$T = k+1 \text{ where } k\frac{\pi}{6} \leq \phi(v_{ABC}) \mod(2\pi) \leq (k+1)\frac{\pi}{6}$$

and k is an integer.

The second continuous input is associated with low-voltage abc side 110b, which is the other of the input side or output side 110 of plant 104. The second continuous input is represented as $v_{abc}$, having a phase and magnitude controlled by an outer loop control that uses system specification and load conditions. Plot 210 shows the low-voltage side reference vector at a time instant divided into multiple sectors. In the example, at any given time instant, six sectors for $\phi(v_{abc}^{ref})$ are shown, each sector is 60 degrees. Plot 220 shows an example sector 212 at a time instant, with $|v_{abc}^{ref}|$ divided into multiple regions 222. In the example shown, $|v_{abc}^{ref}|$, is divided into three regions 222, labeled R1, R2, and R3. At any given time instant, each sector 212 has at least 10 possible switching configurations vectors. In the sector 212 shown in plot 220, region 222 R1 is composed of the first 5 switching configurations smallest in magnitude, region 222 R2 is composed of 4 switching configurations ranked $4^{th}$-$7^{th}$ in increasing magnitude values, and region 222 R3 is composed of 5 switching configurations ranked $6^{th}$-$10^{th}$ in magnitude (meaning the largest 5 possible voltage vector). As described, some of the voltage vectors can appear in more than one sector at a given time.

Applying the example, shown in FIG. 2A, there are T×S×R=216 discrete operating states H, H={1, . . . , 216}.

Turning to FIG. 2B, a plot 230 shows a vector 240 representing magnitude and phase of $v_{abc}^{ref}$ at a given instant plotted relative to each of the 27 switching states 234. Since the input high voltage side is AC, the switching states 234 in plot 230 are not fixed, and circumferential line 232 and spoke lines 236 represent trajectories of the switching states.

With reference to actions, RL actions are defined as the switching states of the MxC. A switching state represents an On-Off state of switches of the MxC at any time instant, which can be chosen to generate the reference voltage vector $v_{abc}^{ref}$. In the MxC control example there are 27 possible switching states A, A={1, . . . , 27}. Accordingly, each reward value in Q-table corresponds to one action a of the actions A and one discrete state s of the finite set H.

In RL, an immediate reward value is a measure for the quality of an action given a state. At each time instant, a reward value is determined based on the environment of the industrial plant. An MxC controller's (e.g., MxC controller 102 shown in FIG. 1) objective is to maximize the expected total reward value it receives over the long run, which can be expressed mathematically as follow: maximize $\mathbb{E}[\Sigma_k \lambda^k r_k]$, where $\mathbb{E}$ denotes an expectation, reward value $r_k$ is a quantitative measure that defines a good and bad switching state for the matrix converter 112 to meet control objectives, and λ (the discount factor) is a number between 0 and 1 (0≤λ≤1). λ has the effect of valuing rewards received earlier higher than those received later.

The algorithm, represented as Q-table (e.g., Q-table 116 shown in FIG. 1) calculates the quality of a state-action combination:

$$Q: H \times A \to \mathbb{R}$$

where H is the discrete operation state of the converter, A is the switching states of the converter, and $\mathbb{R}$ is the set of real numbers.

Before learning begins, values in the Q-table are initialized to possibly arbitrary values. Then, at each time t, an action $a_k$ is selected by selecting a switching state from the 27 available switching states, the reward value $r_k$ is computed from the control objectives, a new state $s_{t+1}$ is entered (depending on both the previous state $s_t$ and the selected action $a_k$), and Q is updated. The core of the algorithm is a simple value iteration update, using the weighted average of the old value and the new information using Equation (1):

$$Q = (s_k, a_k) \leftarrow Q(s_k, a_k) + \alpha \left[ r_k + \lambda \max_a Q(s_{k+1}, a) - Q(s_k, a_k) \right] \quad \text{Equation (1)}$$

where $Q(s_k, a_k)$: Current Q-table value we are updating
α: Learning rate, typical value is 0.1
$r_k$: Reward resulting from applying action $a_k$ at state $s_k$, this would be calculated using the MPC cost function $$Q(s_k, a_k) \leftarrow Q(s_k, a_k) + \alpha \left[ r_k + \lambda \max_a Q(s_{k+1}, a) - Q(s_k, a_k) \right] \quad \text{Equation (1)}$$

Estimated reward from future actions.

Figure 3:
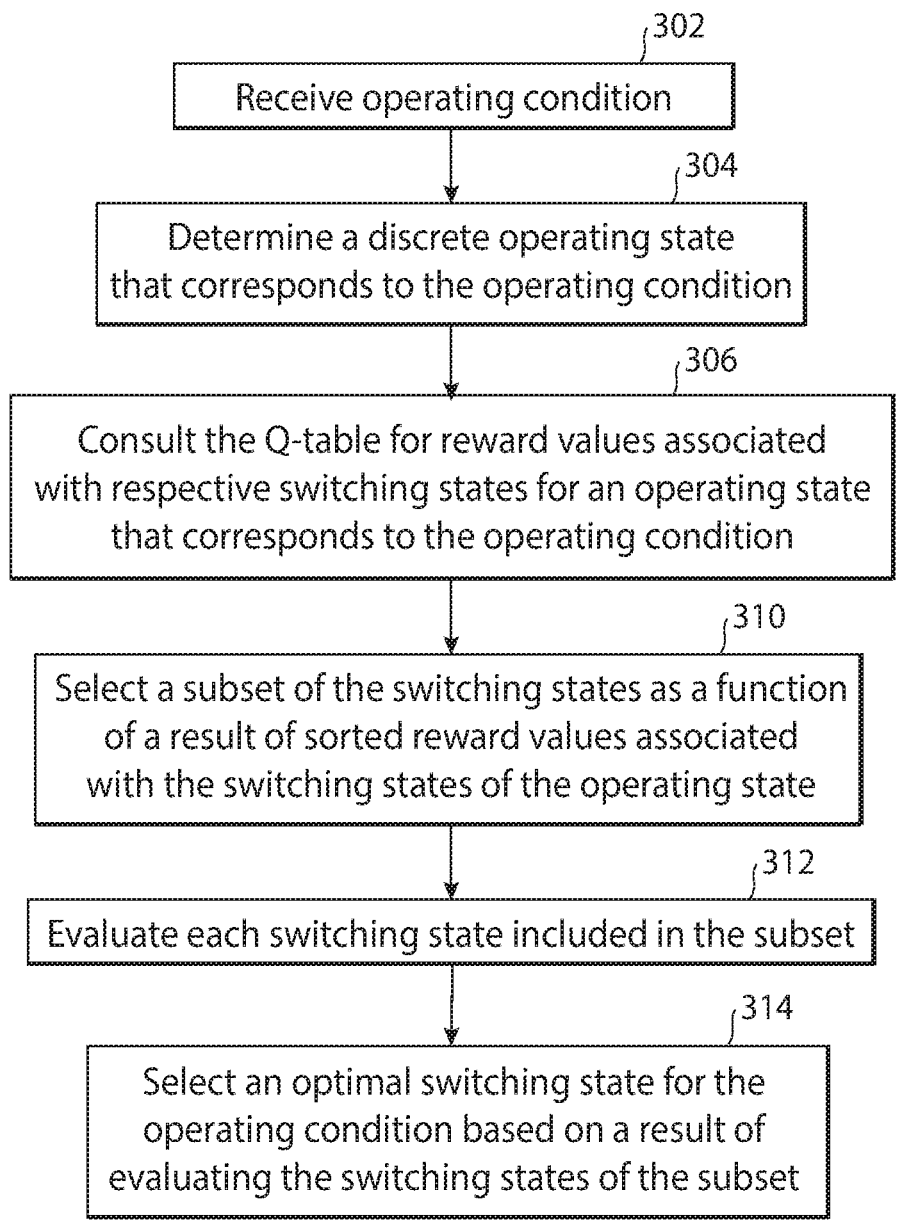
FIG. 3 shows a flowchart of an example method performed during operation of an industrial power plant by a matrix converter controller shown in FIG. 1, in accordance with embodiments of the disclosure.
Figure 4:
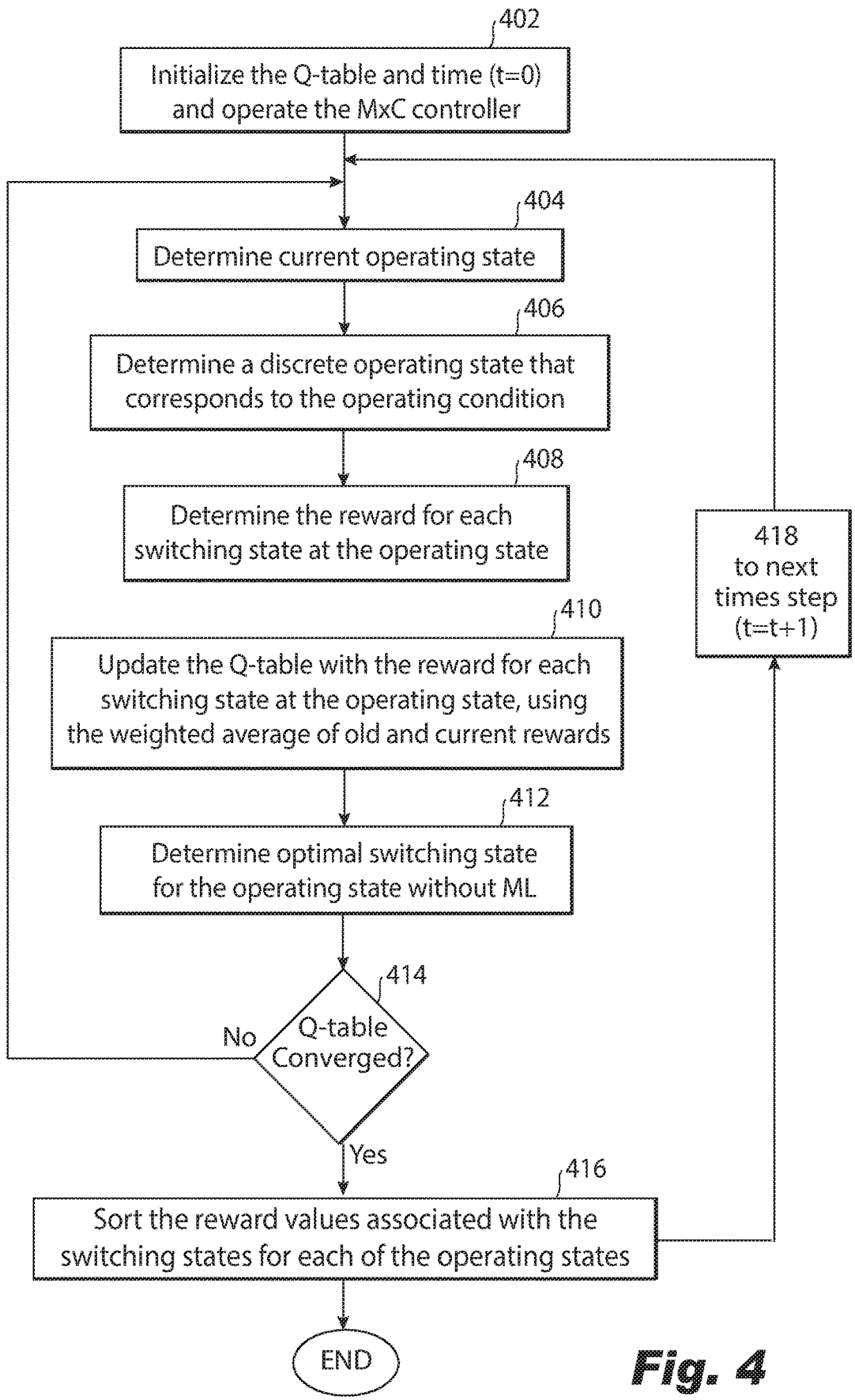
FIG. 4 shows a flowchart of an example method performed by the matrix converter controller during training of a Q-table, in accordance with embodiments of the disclosure.

FIGS. 3 and 4 show exemplary and non-limiting flowcharts illustrating methods for controlling an MxC of an industrial plant in accordance with certain illustrated embodiments. The methods can be performed by an MxC controller, such as MxC controller 102. Before turning to description of FIGS. 3 and 4, it is noted that the flowchart in FIGS. 3 and 4 show an example in which operational steps are carried out in a particular order, as indicated by the lines connecting the blocks, but the various steps shown in this diagram can be performed in a different order, or in a different combination or sub-combination. It should be appreciated that in some embodiments some of the steps described below may be combined into a single step. In some embodiments, one or more additional steps may be included. In some embodiments, one or more of the steps can be omitted.

With reference to FIG. 3, the figure shows a method of controlling the MxC during operation of the industrial plant once the Q-table has been trained. At block 302, an operating condition of the industrial plant is received, as described in greater detail below. The operating condition can include multiple conditions, such as a multi-phase high-voltage side (HVS) voltage/current signal and a multi-phase low-voltage side reference voltage (LVSR) signal. At block 304, a discrete operating state is determined that corresponds to the operating condition, such as by applying space vector modulation (SVM).

At block 306, the trained Q-table is consulted for reward values associated with respective switching states for an operating state that corresponds to the operating condition. At block 310, a subset of the switching states is selected as a function of a result of sorted reward values associated with the switching states of the operating state.

At block 312, each switching state included in the subset is evaluated. Evaluating the switching states included in the subset can include determining a reward value for the operating condition based on one or more objectives. Each switching state of the selected subset is evaluated as a function of the computed reward value and the reward value in the Q-table mapped to the switching state of the operating condition. At block 314, an optimal switching state is selected for the operating condition based on a result of evaluating the switching states of the subset.

FIG. 4 shows an example method of training the Q-table using Q-learning. The Q-table is trained either in a real environment of the industrial plant system or offline with a simulation software using Q-learning to map, till convergence, a reward value predicted for respective switching states of the plurality of switching states to respective discrete operating states of a plurality of operating states. The reward values that are mapped to the switching states are a predicted future reward value based on at least one objective. In one or more embodiments, the reward values are based on multiple control objectives.

Figure 2B:
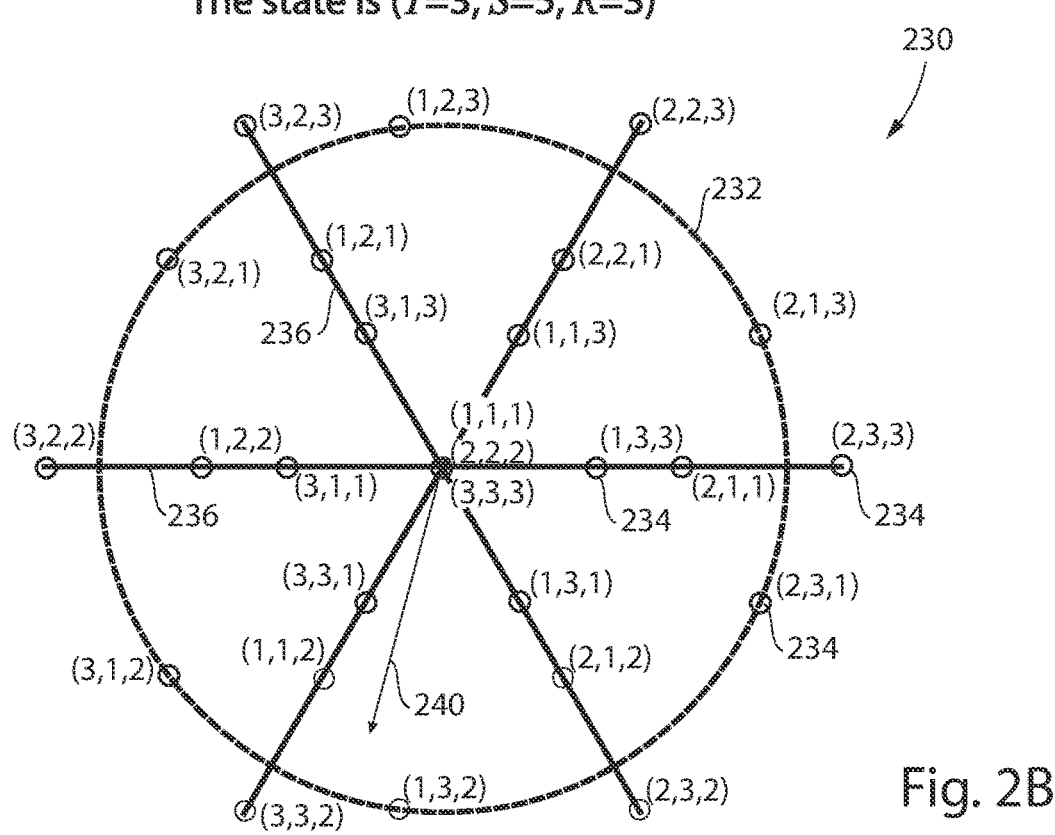

At block 402, time is initialized (t=0), the Q-table is initialized, and the MxC controller is operated. The Q-table provides an entry for each switching state at each operating condition. Each entry can be initialized with an initial reward value (e.g., the initial reward can be set to be equal to 0 for all entries in Q-table). The MxC controller is operated with an industrial plant (such as industrial plant 104 shown in FIGS. 1 and 2) in actual environmental conditions over time at regular time intervals t. Operation in the actual environmental conditions can include, for example, applying electrical signals by the generator to an MxC (such as MxC 112 shown in FIG. 1) as controlled by the MxC controller, wherein a load operates by using a signal output by the MxC. This can be performed online using the real MxC system hardware or offline using a simulation software (e.g., MATLAB/SIMULINK). At block 404, a current operating state is determined by determining a discrete state that corresponds to continuous operating conditions of the industrial plant. At block 406, a discrete operating state is determined that corresponds to the operating condition. At block 408, the current reward is determined for each switching state at the operating state. The current reward can be a function of one or more control objectives. At block 410, the entries of the Q-table for the switching states associated with the operating condition are updated with a reward, using a weighted average of old and current rewards determined at block 408. At block 412, an optimal switching state is determined for the operating state using standard control without RL.

At block 414, a determination is made whether convergence of the Q-table is achieved. The convergence is determined if changes to values in the Q-table are within acceptable margins (i.e., Bellman error is below a predefined convergence threshold). If convergence is determined at block 414 to be achieved, then at block 416, the reward values associated with the switching states for each of the operating states are sorted and the method ends, meaning the Q-table is trained and ready to be applied during operation, such as in the method shown in FIG. 2. If convergence is determined at block 414 to be incomplete, the method continues at block 418 by advancing to the next time interval t=t+1, after which the method continues at block 404.

Aspects of the present disclosure are described above with reference to block diagrams of methods, apparatus (systems) and computer program products according to embodiments of the disclosure. Features of the methods described include operations, such as equations, transformations, conversions, etc., that can be performed using software, hardware, and/or firmware. Regarding software implementations, it will be understood that individual blocks of the block diagram illustrations and combinations of blocks in the block diagram illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block diagram block or blocks.

Figure 5:
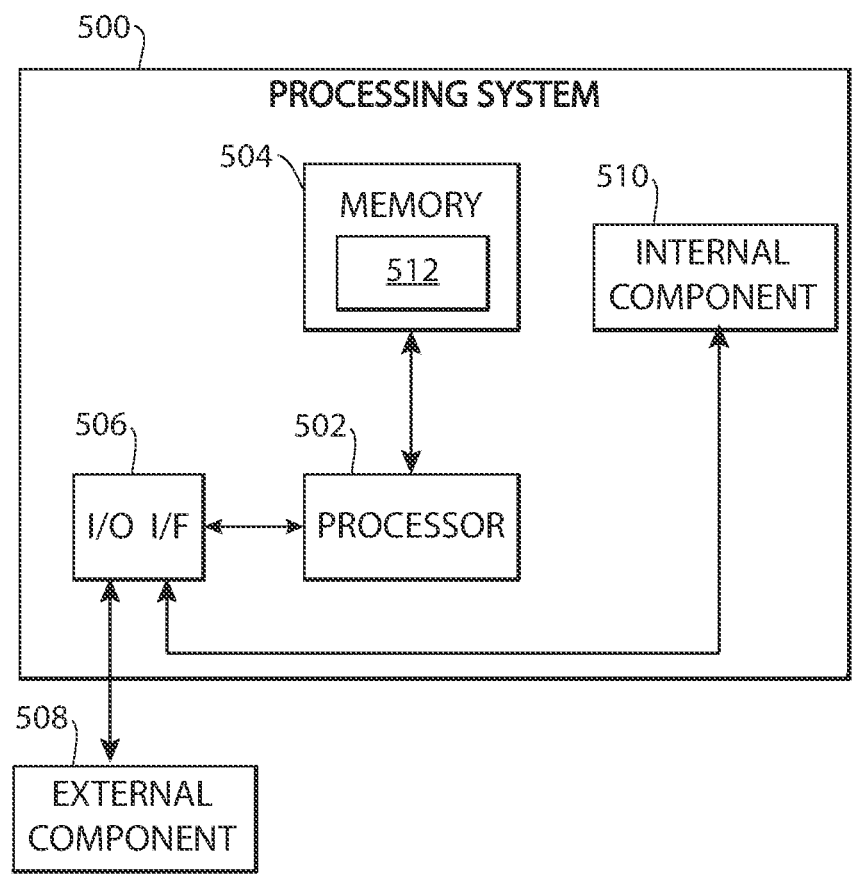
FIG. 5 shows a block diagram of an exemplary computer system configured to implement components of a matrix converter controller of FIG. 1.

With reference to FIG. 5, a block diagram of an example computing system 500 is shown, which provides an example configuration of the MxC controller 102 or one or more portions of the MxC controller 102. Computing system 500 is only one example of a suitable system and is not intended to suggest any limitation as to the scope of use or functionality of embodiments of the disclosure described herein. Computing system 500 can be implemented using hardware, software, and/or firmware. Regardless, computing system 500 is capable of being implemented and/or performing functionality as set forth in the disclosure.

Computing system 500 is shown in the form of a general-purpose computing device. Computing system 500 includes a processing device 502, memory 504, an input/output (I/O) interface (I/F) 506 that can communicate with an internal component 510, and optionally an external component 508.

The processing device 502 can include, for example, a programmable logic device (PLOD), microprocessor, digital signal processor (DSP), a microcontroller, a field programmable gate array (FPGA), an application specific integrated circuit (ASCI), and/or other discrete or integrated logic circuitry having similar processing capabilities.

The processing device 502 and the memory 504 can be included in components provided in the FPGA, ASCI, microcontroller, or microprocessor, for example. Memory 504 can include, for example, volatile and non-volatile memory for storing data temporarily or long term, and for storing programmable instructions 512 executable by the processing device 502. 1/0 1/F 506 can include an interface and/or conductors to couple to the one or more internal components 510 and/or external components 508.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the block diagram block or blocks.

Embodiments of the MxX controller 102 may be implemented or executed by one or more computer systems, such as a microprocessor. Each computer system 500 can implement controller 102, or multiple instances thereof. In various embodiments, computer system 500 may include one or more of a microprocessor, an FPGA, application specific integrated circuit (ASCI), microcontroller. The computer system 500 can be provided as an embedded device. All or portions of the computer system 500 can be provided externally, such by way of a mobile computing device, a smart phone, a desktop computer, a laptop, or the like.

Computer system 500 is only one example of a suitable system and is not intended to suggest any limitation as to the scope of use or functionality of embodiments of the disclosure described herein. Regardless, computer system 500 is capable of being implemented and/or performing any of the functionality set forth hereinabove.

Computer system 500 may be described in the general context of computer system-executable instructions, such as program modules, being executed by a computer system. Generally, program modules may include routines, programs, objects, components, logic, data structures, and so on that perform particular tasks or implement particular abstract data types.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A matrix converter system of an industrial plant system comprising:
    a matrix converter having a switching matrix coupled between an input side and an output side;
    a model predictive controller (MPC) configured to select a switching state of the switching matrix from a plurality of switching states, the MPC configured to:
        receive an operating condition of the industrial plant system;
        consult a Q-data structure to access reward values that are mapped to respective switching states of the switching matrix for an operating state that corresponds to the operating condition, wherein the Q-data structure has been trained in a real or simulation environment of the industrial plant system using Q-learning to map till convergence a reward value predicted for the respective switching states of the plurality of switching states and respective discrete operating states of a plurality of discrete operating states;

sort the reward values predicted for and mapped to the respective switching states for a discrete operating state of the plurality of discrete operating states that corresponds to the operating condition;
select a subset of the mappings as a function of a result of sorting the reward values associated with the switching states of the operating state;
evaluate by analyzing each switching state included in the subset; and
select an optimal switching state for the operating condition based on a result of evaluating the switching states of the subset, including using space vector modulation (SVM) to determine a discrete operating state of the plurality of discrete operating states that corresponds to the operating condition,
wherein the operating condition includes a multi-phase high-voltage side (HVS) voltage signal and a multi-phase low-voltage side reference voltage (LVSR) signal, and the SVM includes:
dividing the HVS voltage signal at any time instant into M even phase segments over a full cycle;
dividing phase of the LVSR voltage signal into N even sectors; and
dividing magnitude of each sector into P regions, wherein the plurality of discrete operating states includes M×N×P states.

2. The matrix converter system of claim 1, wherein the analysis includes computing a newly computed reward value for the operating condition based on one or more objectives.

3. The matrix converter system of claim 2, wherein the reward value mapped to each switching state is based on at least one training objective.

4. The matrix converter system of claim 2, wherein evaluating each switching state of the selected subset is a function of the computed reward value from the continuous operating condition and the Q-table reward value mapped to the switching state of the discrete operating condition.

5. The matrix converter system of claim 1, wherein the reward value mapped to each switching state is based on multiple control objectives.

6. The matrix converter system of claim 1, wherein the MPC controller is further configured to train the Q-data structure.

7. The matrix converter system of claim 1, wherein the reward value mapped to each switching state of the respective operating states includes a predicted future reward value.

8. A method of controlling a matrix converter system, the matrix converter having a switching matrix coupled between an input side and an output side, the method comprising:
receiving an operating condition of an industrial plant system;
consulting a Q-data structure to access reward values that are mapped to respective switching states of the switching matrix for an operating state that corresponds to the operating condition, wherein the Q-data structure has been trained in a real or simulation environment of the industrial plant system using Q-learning to map till convergence a reward value predicted for respective switching states of the plurality of switching states and respective discrete operating states of a plurality of discrete operating states;
sorting the reward values predicted for and mapped to the respective switching states for a discrete operating state of the plurality of discrete operating states that corresponds to the operating condition;
selecting a subset of the set of the mappings as a function of a result of sorting the reward values associated with the switching states of the operating state;
evaluating by analyzing each switching state included in the subset; and
selecting an optimal switching state for the operating condition based on a result of evaluating the switching states of the subset, including using space vector modulation (SVM) to determine a discrete operating state of the plurality of discrete operating states that corresponds to the operating condition,
wherein the operating condition includes a multi-phase high-voltage side (HVS) voltage signal and a multi-phase low-voltage side reference voltage (LVSR) signal, and the SVM includes:
dividing the HVS voltage signal at any time instant into M even phase segments over a full cycle;
dividing phase of the LVSR voltage signal into N even sectors; and
dividing magnitude of each sector into P regions, wherein the plurality of discrete operating states includes M×N×P states.

9. The method of claim 8, wherein the analysis includes determining a newly computed reward value for the operating condition based on one or more objectives.

10. The method of claim 9, wherein the reward value for each switching state is based on at least one training objective.

11. The method of claim 9, wherein evaluating each switching state of the selected subset is a function of the current reward value and the reward value mapped to the switching state of the operating condition.

12. The method of claim 8, further comprising training the Q-data structure.

13. The method of claim 8, wherein the reward value mapped to each switching state of the respective operating states is a predicted future reward value.

14. A control system for a matrix converter having a switching matrix coupled between an input side and an output side, the control system comprising:
a model predictive controller (MPC) configured to select a switching state of the switching matrix from a plurality of switching states, the MPC configured to:
receive an operating condition of the industrial plant system;
consult a Q-data structure to access reward values that are mapped to respective switching states of the switching matrix for an operating state that corresponds to the operating condition, wherein the Q-data structure has been trained in a real or simulation environment of the industrial plant system using Q-learning to map till convergence a reward value predicted for the respective switching states of the plurality of switching states and respective discrete operating states of a plurality of discrete operating states;
sort the reward values predicted for and mapped to the respective switching states for a discrete operating state of the plurality of discrete operating states that corresponds to the operating condition;
select a subset of the mappings as a function of a result of sorting the reward values associated with the switching states of the operating state;
evaluate by analyzing each switching state included in the subset; and
select an optimal switching state for the operating condition based on a result of evaluating the switching states of the subset, including using space vector modulation (SVM) to determine a discrete operating state of the plurality of discrete operating states that corresponds to the operating condition,
wherein the operating condition includes a multi-phase high-voltage side (HVS) voltage signal and a multi-phase low-voltage side reference voltage (LVSR) signal, and the SVM includes:
dividing the HVS voltage signal at any time instant into M even phase segments over a full cycle;
dividing phase of the LVSR voltage signal into N even sectors; and
dividing magnitude of each sector into P regions, wherein the plurality of discrete operating states includes MxNxP states.

15. The controller of claim 14, wherein the analysis includes determining a newly computed reward value for the operating condition based on one or more objectives, wherein evaluating each switching state of the selected subset is a function of the current reward value and the reward value mapped to the switching state of the operating condition.

16. The controller of claim 14, wherein the reward value mapped to each switching state of the respective operating states is a predicted future reward value.

* * * * *